(12) United States Patent
Yoshioka

(10) Patent No.: US 11,103,862 B2
(45) Date of Patent: Aug. 31, 2021

(54) HONEYCOMB FILTER

(71) Applicant: NGK Insulators, Ltd., Nagoya (JP)

(72) Inventor: Fumihiko Yoshioka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/815,549

(22) Filed: Mar. 11, 2020

(65) Prior Publication Data

US 2020/0306739 A1    Oct. 1, 2020

(30) Foreign Application Priority Data

Mar. 29, 2019  (JP) .............................. JP2019-066134

(51) Int. Cl.
| | | |
|---|---|---|
| *B01D 46/24* | (2006.01) | |
| *B01J 35/04* | (2006.01) | |
| *C04B 38/00* | (2006.01) | |
| *B01D 53/88* | (2006.01) | |

(52) U.S. Cl.
CPC ........... *B01J 35/04* (2013.01); *C04B 38/0009* (2013.01); *B01D 53/885* (2013.01); *B01D 2255/9202* (2013.01); *B01D 2255/9205* (2013.01)

(58) Field of Classification Search
None
See application file for complete search history.

(56) References Cited

U.S. PATENT DOCUMENTS

| | | | |
|---|---|---|---|
| 2005/0120691 A1 | 6/2005 | Miwa | |
| 2009/0047188 A1* | 2/2009 | Miyairi | ................. F01N 3/0222 |
| | | | 422/180 |
| 2016/0348552 A1* | 12/2016 | Hatakeyama | ......... F01N 3/0222 |

FOREIGN PATENT DOCUMENTS

| | | |
|---|---|---|
| JP | 2002-336620 A1 | 11/2002 |
| JP | 2003-269132 A1 | 9/2003 |
| JP | 2012-081415 A1 | 4/2012 |
| JP | 2015-009205 A1 | 1/2015 |

OTHER PUBLICATIONS

U.S. Appl. No. 16/815,488, filed Mar. 11, 2020, Fumihiko Yoshioka.
U.S. Appl. No. 16/815,523, filed Mar. 11, 2020, Fumihiko Yoshioka.
U.S. Appl. No. 16/815,574, filed Mar. 11, 2020, Fumihiko Yoshioka.

* cited by examiner

*Primary Examiner* — Humera N. Sheikh
*Assistant Examiner* — Mary I Omori
(74) *Attorney, Agent, or Firm* — Burr & Brown, PLLC

(57) ABSTRACT

A honeycomb filter includes a pillar-shaped honeycomb structure having porous partition walls provided, surrounding a plurality of cells which serve as fluid through channels extending from an inflow end face to an outflow end face, and porous plugging portions provided either at the ends on the inflow end face or the outflow end face of the cells, wherein the plugging portions are composed of a porous material, the honeycomb structure has a central region and a circumferential region and a ratio of an area of the circumferential region with respect to that of the central region ranges from 0.1 to 0.5, and a plugging length L1 in the cell extending direction of a central plugging portion in the central region is smaller than a plugging length L2 of a circumferential plugging portion in the circumferential region, L1 ranges from 3 to 6 mm, and L2 from 7 to 9 mm.

3 Claims, 4 Drawing Sheets

HONEYCOMB FILTER

The present application is an application based on JP 2019-066134 filed on Mar. 29, 2019 with Japan Patent Office, the entire contents of which are incorporated herein by reference.

BACKGROUND OF THE INVENTION

Field of the Invention

The present invention relates to a honeycomb filter. More particularly, the present invention relates to a honeycomb filter which, when loaded with an exhaust gas purifying catalyst, enables exhaust gas purification performance to be improved, effectively restrains plugging portions from falling off from cells, and exhibits high isostatic strength.

Description of the Related Art

Hitherto, as a filter adapted to trap particulate matter in an exhaust gas emitted from an internal combustion engine, such as a diesel engine, or a device adapted to purify toxic gas components, such as CO, HC, and NOx, there has been known a honeycomb filter using a honeycomb structure (refer to Patent Documents 1 to 4). The honeycomb structure has partition walls formed of a porous ceramic, such as cordierite or silicon carbide, and includes a plurality of cells defined by the partition walls. In the honeycomb filter, the foregoing honeycomb structure is provided with plugging portions that alternately plug the open ends on the inflow end face side of the plurality of cells and the open ends on the outflow end face side thereof. In other words, the honeycomb filter has a structure in which inflow cells having the inflow end face side open and the outflow end face side plugged and outflow cells having the inflow end face side plugged and the outflow end face side open are arranged alternately with the partition walls placed therebetween. Further, in the honeycomb filter, the porous partition walls of the honeycomb structure function as filters that trap the particulate matter in an exhaust gas. Hereinafter, the particulate matter contained in an exhaust gas may be referred to as "PM." The "PM" is an abbreviation of "particulate matter."

In recent years, a honeycomb filter for purifying an exhaust gas emitted from an engine of an automobile or the like has been required to achieve a reduction in pressure loss mainly for improving automobile fuel economy performance. As one of the measures for reducing pressure loss, studies have been conducted on "thinner walls" to reduce the thickness of the partition walls of a honeycomb structure and "higher porosity" to further enhance the porosity of partition walls as compared with the conventional one.

[Patent Document 1] JP-A-2015-009205
[Patent Document 2] JP-A-2012-081415
[Patent Document 3] JP-A-2003-269132
[Patent Document 4] JP-A-2002-336620

Conventional honeycomb filters have been posing a problem in that, when the honeycomb filters are loaded with an exhaust gas purifying catalyst, it is difficult to obtain satisfactory exhaust gas purification performance. For example, in recent years, there has been a demand for improving the purification performance of honeycomb filters for purifying exhaust gases emitted from the engines of automobiles in order to comply with exhaust gas regulations enhanced every year because of consideration of environmental issues. To respond to the demand, it has been required, for example, to promptly activate a catalyst loaded in a honeycomb filter by increasing the temperature rising speed of the catalyst. Hence, there have been requests for developing a honeycomb filter capable of promptly providing satisfactory exhaust gas purification performance.

Further, conventional honeycomb filters pose a problem in that plugging portions easily fall off from the ends of cells. There has been another problem in that the plugging portions are damaged due to various types of stresses applied to the honeycomb filters even if the plugged portions do not fall off.

For example, when a honeycomb filter is used as a filter for purifying an exhaust gas, the honeycomb filter is sometimes used by being housed in a can body, such as a metal case. Housing a honeycomb filter in a can body, such as a metal case, may be referred to as canning. When canning a honeycomb filter, the honeycomb filter is held in a can body by applying a surface pressure to the circumferential surface of the honeycomb filter through the intermediary of a holding material, such as a mat. Even when such canning is performed, plugging portions fall off from the ends of cells or the plugging portions are damaged in some cases. In particular, the foregoing holding material, such as a mat, is designed to be slightly shorter than the length in an axial direction of the honeycomb filter, and an edge of the holding material is sometimes placed at a position slightly on the inner side from an end face of the honeycomb filter. In such a case, sometimes, in the cells positioned on the circumferential side of the honeycomb filter, the edge of the holding material is inconveniently positioned at the boundary between the plugging portions and the void portions of the cells, causing the plugging portions to easily fall off due to a high stress applied to the vicinity of the above boundary from the holding material.

Further, honeycomb filters have been required to exhibit improved isostatic strength. For example, at the time of canning a honeycomb filter, the honeycomb filter is damaged by a compression surface pressure in some cases. Hence, there has been a demand for developing a honeycomb filter having higher isostatic strength.

SUMMARY OF THE INVENTION

The present invention has been made in view of the problems with the prior arts described above. The present invention provides a honeycomb filter which, when loaded with an exhaust gas purifying catalyst, enables exhaust gas purification performance to be improved, effectively restrains plugging portions from falling off from cells, and exhibits high isostatic strength.

According to the present invention, a honeycomb filter described below is provided.

According to a first aspect of the present invention, a honeycomb filter including:

a pillar-shaped honeycomb structure having porous partition walls provided, surrounding a plurality of cells which serve as fluid through channels extending from an inflow end face to an outflow end face; and porous plugging portions provided either at the ends on the inflow end face side of the cells or at the ends on the outflow end face side of the cells, wherein the plugging portions are composed of a porous material, the honeycomb structure has a central region that includes a center of gravity in a section orthogonal to a direction in which the cells extend and a circumferential region on a farther circumferential side from the central region, and has S2/S1, which denotes a ratio of an area S2 of the circumferential region with respect to an area S1 of the central region, ranging from 0.1 to 0.5, and a plugging length L1 in the cell extending direction of a central plugging portion that is the plugging portion existing in the central region is smaller than a plugging length L2 in the cell extending direction of a circumferential plugging portion that is the plugging portion existing in the circumferential region, the plugging length L1 of the central plugging portion ranges from 3 mm to 6 mm, and the plugging length L2 of the circumferential plugging portion ranges from 7 mm to 9 mm.

According to a second aspect of the present invention, the honeycomb filter described in the foregoing including:

a plurality of the central plugging portions and the circumferential plugging portions arranged from a center of gravity toward a circumference in a radial direction of the section of the honeycomb structure, wherein the central plugging portions are configured such that the plugging lengths of the central plugging portions arranged in order toward the circumference increase in steps from the central plugging portions provided closer to a center in the radial direction of the section, and the circumferential plugging portions are configured such that the plugging lengths of the circumferential plugging portions arranged in order toward the circumference decrease in steps from the circumferential plugging portions provided closer to a center in the radial direction of the section.

According to a third aspect of the present invention, the honeycomb filter described in the foregoing first or second aspects is provided, wherein a cell structure of the honeycomb structure is the same in the central region and the circumferential region.

According to a fourth aspect of the present invention the honeycomb filter described in any one of the foregoing first to third aspects is provided, wherein the porosity of the partition walls ranges from 52% to 66%.

The honeycomb filter in accordance with the present invention provides an effect that, when loaded with an exhaust gas purifying catalyst, enables exhaust gas purification performance to be improved, effectively restrains plugging portions from falling off from cells, and exhibits high isostatic strength. The honeycomb filter according to the present invention is particularly effective as a honeycomb filter provided with a honeycomb structure having higher porosity. More specifically, the plugging length L1 of the central plugging portions is smaller than the plugging length L2 of the circumferential plugging portions, so that an increase in the mass of the honeycomb filter is suppressed, and the temperature rise property of the honeycomb filter is improved, thus enabling an exhaust gas purifying catalyst to be promptly activated. Further, the circumferential plugging portions having the relatively larger plugging length L2 enable the isostatic strength to be improved. Hence, damage or the like to the honeycomb filter can be effectively suppressed even if a high compression surface pressure is applied when canning the honeycomb filter into a can body, such as a metal case. Further, the relatively larger plugging length L2 of the circumferential plugging portions minimizes the possibility of the edge of the holding material, such as a mat, being positioned in the vicinity of the boundary between the plugging portions and the void portions of the cells at the time of the foregoing canning. This makes it possible to effectively restrain the plugging portions from falling off.

DETAILED DESCRIPTION OF THE PRESENT INVENTION

The following will describe embodiments of the present invention; however, the present invention is not limited to the following embodiments. Therefore, it should be understood that those created by adding changes, improvements and the like to the following embodiments, as appropriate, on the basis of the common knowledge of one skilled in the art without departing from the spirit of the present invention are also covered by the scope of the present invention.

(1) Honeycomb Filter

Figure 1:
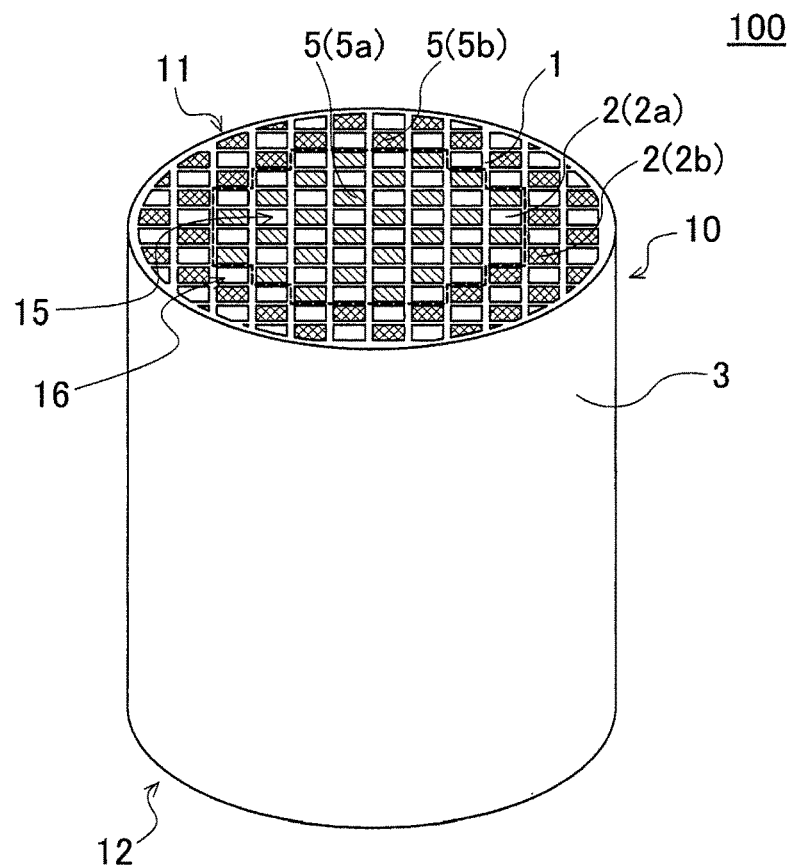
FIG. 1 is a perspective view schematically showing an embodiment of a honeycomb filter in accordance with the present invention.
Figure 2:
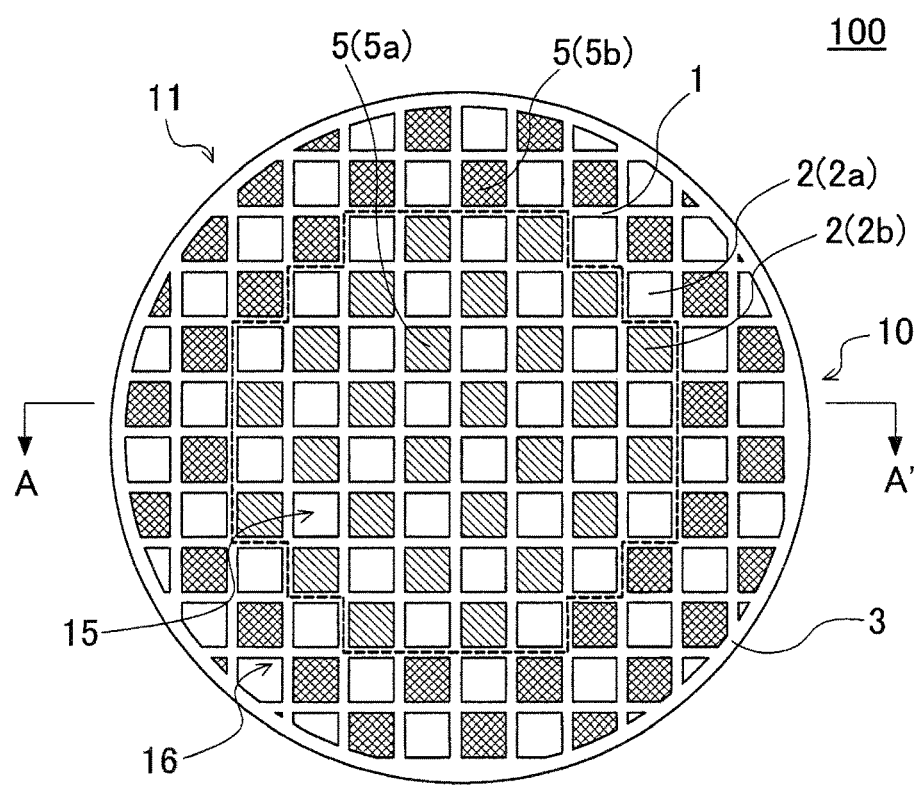
FIG. 2 is a plan view showing the inflow end face side of the honeycomb filter shown in FIG. 1.
Figure 3:
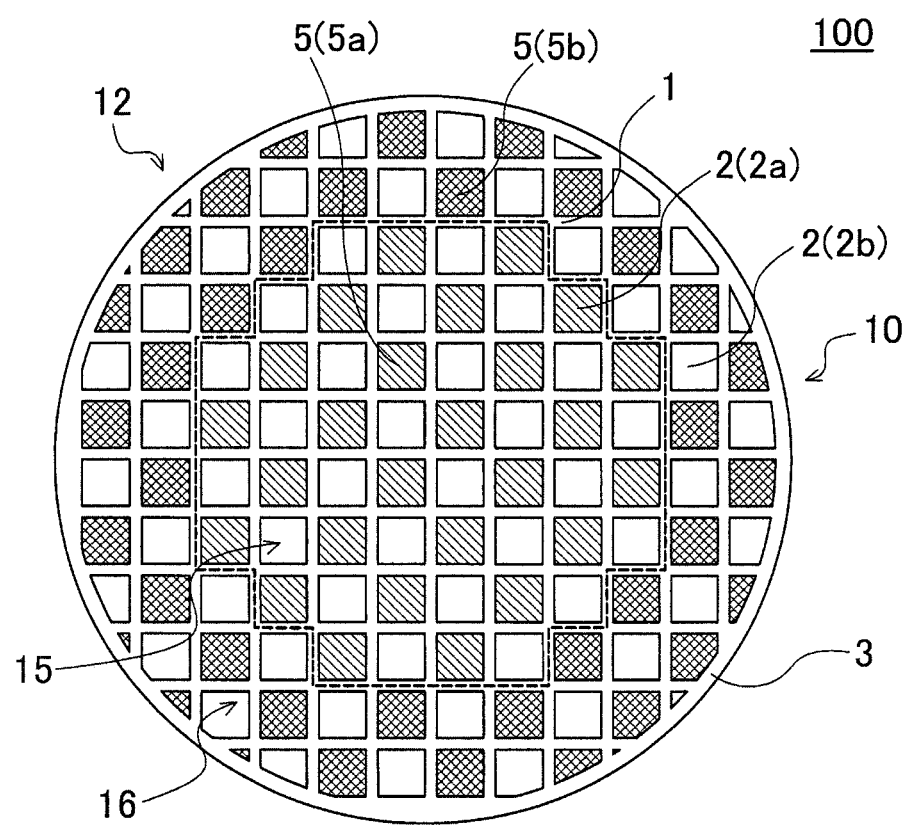
FIG. 3 is a plan view showing the outflow end face side of the honeycomb filter shown in FIG. 1.
Figure 4:
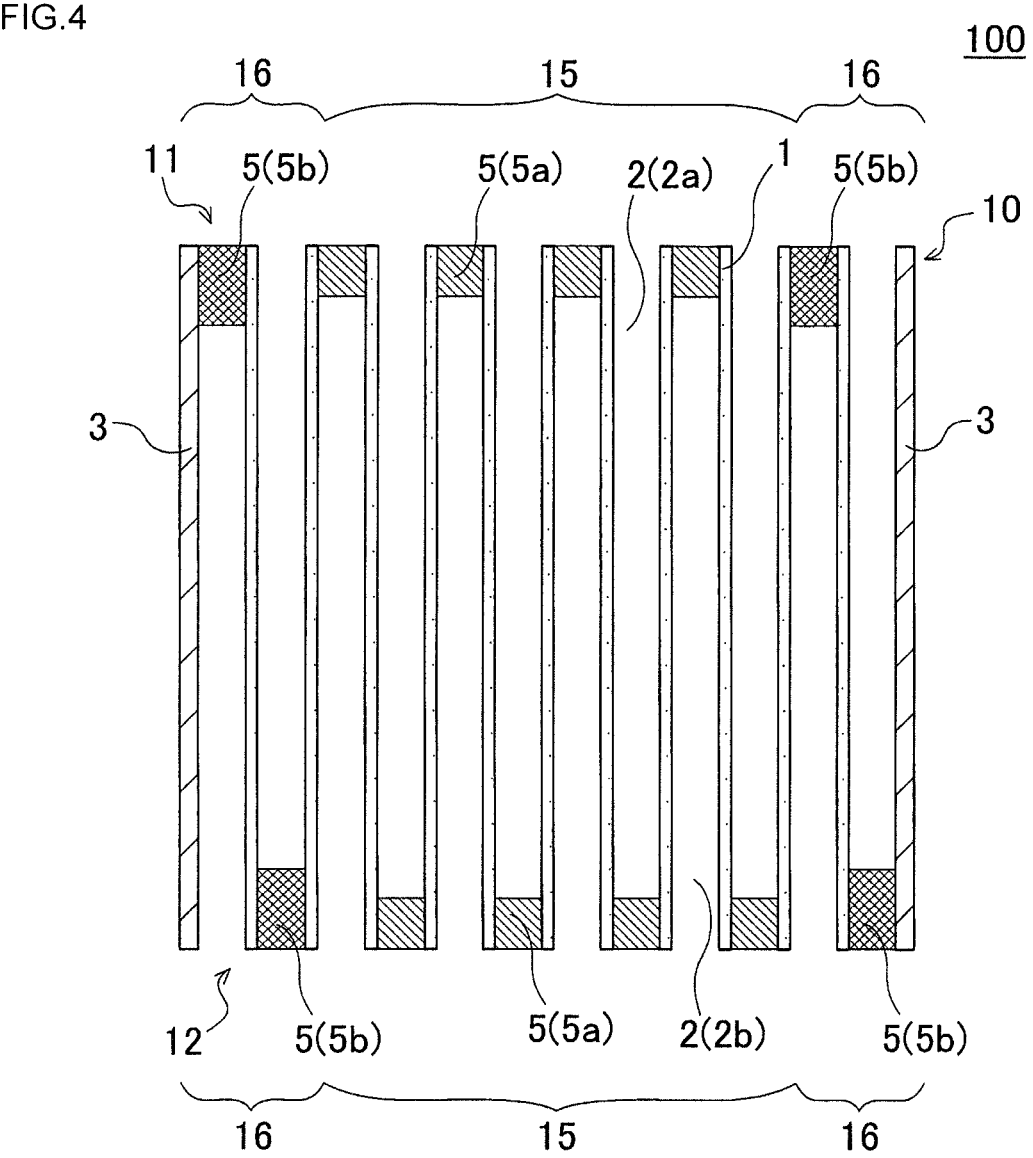
FIG. 4 is a sectional view schematically showing the section taken along A-A' of FIG. 2.

An embodiment of the honeycomb filter in accordance with the present invention is a honeycomb filter 100 shown in FIG. 1 to FIG. 4. FIG. 1 is a perspective view schematically showing the embodiment of the honeycomb filter in accordance with the present invention. FIG. 2 is a plan view of the inflow end face side of the honeycomb filter shown in FIG. 1. FIG. 3 is a plan view of the outflow end face side of the honeycomb filter shown in FIG. 1. FIG. 4 is a sectional view schematically showing a section taken along A-A' of FIG. 2.

As shown in FIG. 1 to FIG. 4, the honeycomb filter 100 includes a honeycomb structure 10 and plugging portions 5. The honeycomb structure 10 has porous partition walls 1 placed, surrounding a plurality of cells 2 which serve as fluid through channels extending from an inflow end face 11 to an outflow end face 12. The honeycomb structure 10 is a pillar-shaped structure having the inflow end face 11 and the outflow end face 12 as both end faces thereof. In the honeycomb filter 100 of the present embodiment, the honeycomb structure 10 further has a circumferential wall 3 provided, encompassing the partition walls 1 on the circumferential side surface thereof.

The plugging portions 5 are provided either at the ends on the inflow end face 11 side of the cells 2 or at the ends on the outflow end face 12 side of the cells 2 to plug the open ends of the cells 2. The plugging portions 5 are porous substances (i.e. porous bodies) composed of a porous material. In the honeycomb filter 100 shown in FIG. 1 to FIG. 4, the predetermined cells 2 having the plugging portions 5 provided at the ends on the inflow end face 11 side and the residual cells 2 having the plugging portions 5 provided at the ends on the outflow end face 12 side are alternately arranged with the partition walls 1 placed therebetween. In the following description, the cells 2 having the plugging portions 5 provided at the ends on the inflow end face 11 side may be referred to as "the outflow cells 2b." The cells 2 having the plugging portions 5 provided at the ends on the outflow end face 12 side may be referred to as "the inflow cells 2a."

In the honeycomb filter 100, the honeycomb structure 10 has a central region 15, which includes the center of gravity in a section orthogonal to the extending direction of the cells 2, and a circumferential region 16 located on the circumferential side with respect to the central region 15. Hereinafter, "the section orthogonal to the extending direction of the cells 2 of the honeycomb structure 10" may be referred to simply as the section of the honeycomb structure 10. Further, "the center of gravity" of the section of the honeycomb structure 10 refers to the center of gravity of the section in a geometrical sense (in other words, the geometrical center). In the honeycomb filter 100, the ratio of an area S2 of the circumferential region 16 with respect to an area S1 of the central region 15, i.e. S2/S1, ranges from 0.1 to 0.5. Hereinafter, in the present specification, "the ratio of the area S2 of the circumferential region 16 with respect to the area S1 of the central region 15" may be referred to as "the area ratio (S2/S1)."

In the honeycomb filter 100, the plugging portions 5 existing in the central region 15 will be referred to as "the central plugging portions 5a". Further, the plugging portions 5 existing in the circumferential region 16 will be referred to as "the circumferential plugging portions 5b". The honeycomb filter 100 is configured such that the plugging length L1 of the central plugging portions 5a in the direction in which the cells 2 extend is smaller than the plugging length L2 of the circumferential plugging portions 5b in the direction in which the cells 2 extend. The honeycomb filter 100 provides an effect that, when loaded with an exhaust gas purifying catalyst, enables exhaust gas purification performance to be improved, effectively restrains plugging portions 5 from falling off from the cells 2, and exhibits high isostatic strength. The honeycomb filter 100 is effectively used particularly in the honeycomb filter 100 provided with the honeycomb structure 10 having higher porosity. More specifically, the plugging length L1 of the central plugging portions 5a is smaller than the plugging length L2 of the circumferential plugging portions 5b, so that an increase in the mass of the honeycomb filter 100 is suppressed, and the temperature rise property of the honeycomb filter 100 is improved, thus enabling an exhaust gas purifying catalyst to be promptly activated. Further, the circumferential plugging portions 5b having the relatively larger plugging length L2 enable the isostatic strength to be improved. Hence, damage or the like to the honeycomb filter 100 can be effectively suppressed even if a high compression surface pressure is applied when canning the honeycomb filter 100 into a can body, such as a metal case. Further, the relatively larger plugging length L2 of the circumferential plugging portions 5b minimizes the possibility of the edge of the holding material, such as a mat, being positioned in the vicinity of the boundary between the plugging portions 5 and the void portions of the cells 2 at the time of the foregoing canning. This makes it possible to effectively restrain the plugging portions 5 from falling off.

If the honeycomb filter 100 is configured such that the plugging length L1 of the central plugging portions 5a in the direction in which the cells 2 extend is equal to or larger than the plugging length L2 of the circumferential plugging portions 5b in the direction in which the cells 2 extend, then the foregoing effect will not be obtained. Hereinafter, the plugging length L1 of the central plugging portions 5a in the direction in which the cells 2 extend may be referred to simply as "the plugging length L1 of the central plugging portions 5a." Further, the plugging length L2 of the circumferential plugging portions 5b in the direction in which the cells 2 extend may be referred to simply as "the plugging length L2 of the circumferential plugging portions 5b."

There is no particular restriction on the shape of the central region 15 insofar as the central region 15 is a region that includes the center of gravity of the section of the honeycomb structure 10. The central region 15 is a region in which there are the central plugging portions 5a having the plugging length L1 ranging from 3 mm to 6 mm. Further, the circumferential region 16 is a region in which there are the circumferential plugging portions 5b having the plugging length L2 ranging from 7 mm to 9 mm. The central region 15 may have, for example, the center of gravity at the same position as that of the honeycomb structure 10, and may be shaped similarly to or differently from the circumferential shape of the honeycomb structure 10. Shaping the central region 15 similarly to the circumferential shape of the honeycomb structure 10 causes the foregoing effect to be further effectively exhibited.

Each plugging length of the plugging portions 5 can be measured as described below. A bar having a length which is known and which is larger than the total length of the honeycomb filter 100 is inserted in each of the cells 2, and the plugging length is measured from the difference between the length of a portion of the bar exposed from the honeycomb filter 100 and the length of the bar itself. When measuring each plugging length of the plugging portions 5, the plugging lengths of all the plugging portions 5 provided at the ends of the cells 2 of the honeycomb structure 10 are to be measured.

By measuring each plugging length of the plugging portions 5 as described above, the central region 15 and the circumferential region 16 can be defined. Further, among the plugging portions 5, the plugging portions 5 existing in the central region 15 are "the central plugging portions 5a", and the plugging portions 5 existing in the circumferential region 16 are "the circumferential plugging portions 5b". Further, in the honeycomb filter 100, the plugging length L1 of the central plugging portions 5a is smaller than the plugging length L2 of the circumferential plugging portions 5b. More specifically, the plugging length L1 of the central plugging portions 5a ranges from 3 mm to 6 mm, and the plugging length L2 of the circumferential plugging portions 5b ranges from 7 mm to 9 mm.

In terms of isostatic strength, it is not preferable that the area ratio (S2/S1), which is the ratio of the area S2 of the circumferential region 16 with respect to the area S1 of the central region 15, be below 0.1. Further, in terms of pressure loss, it is not preferable that the (S2/S1) exceed 0.5. The area ratio (S2/S1) preferably ranges from 0.2 to 0.4.

The plugging length L1 of the central plugging portions 5a ranges from 3 mm to 6 mm, preferably ranges from 3 mm to 5 mm, and more preferably ranges from 4 mm to 5 mm. It is not preferable that the plugging length L1 of the central plugging portions 5a be below 3 mm in terms of thermal shock resistance and wear or scraping (erosion) of the plugging portions and the like attributable to foreign matter coming together with an exhaust gas flow. In terms of the purification performance after catalyst coating, it is not preferable that the plugging length L1 of the central plugging portions 5a exceed 6 mm.

The plugging length L2 of the circumferential plugging portions 5b ranges from 7 mm to 9 mm, preferably ranges from 7.5 mm to 9 mm, and more preferably ranges from 8 mm to 9 mm. In terms of isostatic strength, which is the strength of the filter itself, it is not preferable that the plugging length L2 of the circumferential plugging portions 5b be below 7 mm. In terms of pressure loss, it is not preferable that the plugging length L2 of the circumferential plugging portions 5b exceed 9 mm.

Figure 5:
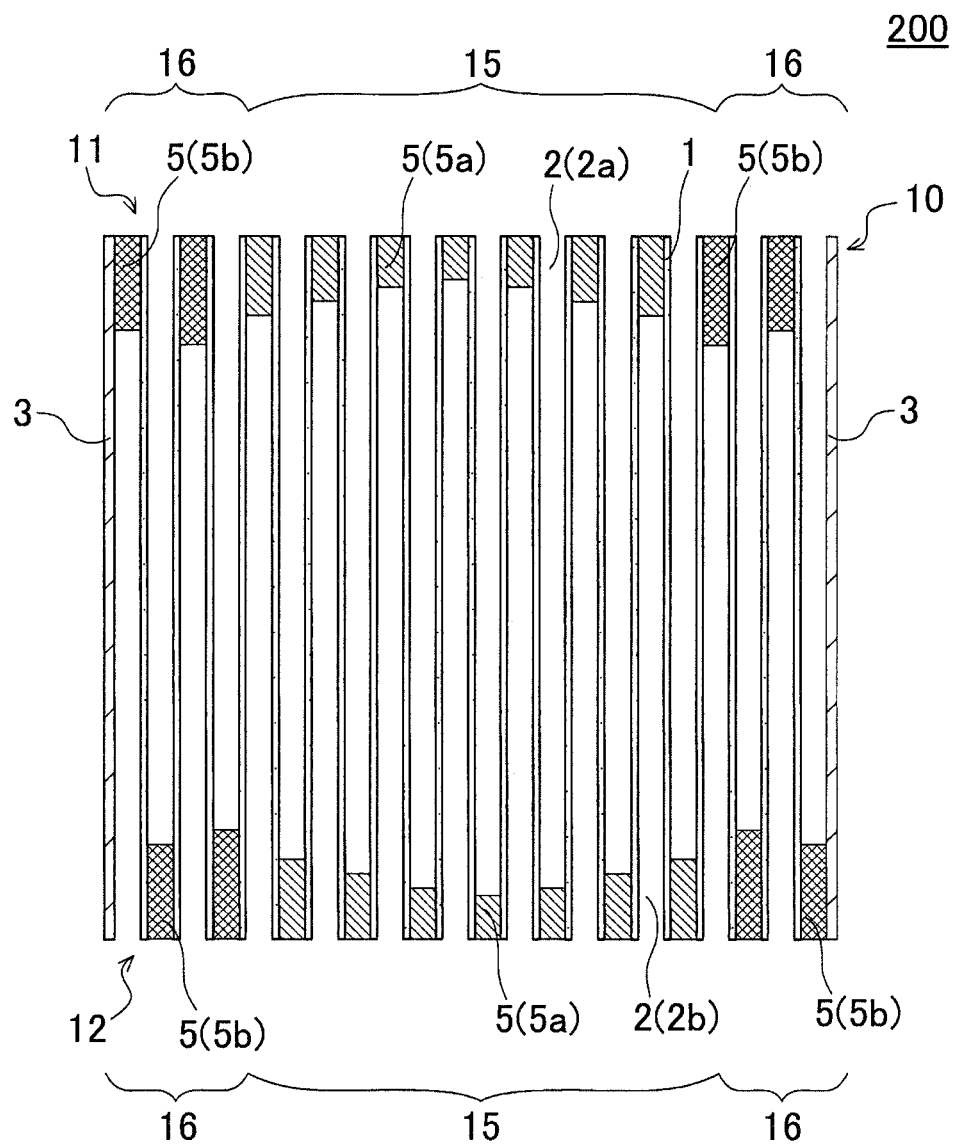
FIG. 5 is a sectional view schematically showing another embodiment of the honeycomb filter in accordance with the present invention.

The honeycomb filter 100 has a plurality of central plugging portions 5a and circumferential plugging portions 5b arranged toward the circumference from the center of gravity in the radial direction of the section of the honeycomb structure 10. The honeycomb filter 100 is configured such that the plugging length L1 of the central plugging portions 5a existing in the central region 15 is substantially constant, and the plugging length L2 of the circumferential plugging portions 5b existing in the circumferential region 16 is substantially constant. However, the value of the plugging length L1 of the central plugging portions 5a in the central region 15 may vary within the central region 15. Further, the value of the plugging length L2 of the circumferential plugging portions 5b in the circumferential region 16 may vary within the circumferential region 16. For example, as with a honeycomb filter 200 shown in FIG. 5, the central plugging portions 5a and the circumferential plugging portions 5b may be configured as described below. The central plugging portions 5a may be configured such that the plugging length of the central plugging portions 5a arranged in order toward the circumference increases in steps from the central plugging portions 5a provided closer to the center of gravity in the radial direction of the section. Further, the circumferential plugging portions 5b may be configured such that the plugging length of the circumferential plugging portions 5b arranged in order toward the circumference decreases in steps from the central plugging portions 5a provided closer to the center of gravity in the radial direction of the section. In other words, the honeycomb filter 200 shown in FIG. 5 is configured such that the plugging length L1 of the central plugging portions 5a increases in steps as the distance of the central plugging portions 5a from the center of gravity of the section of the honeycomb structure 10 increases toward the circumference, and the plugging length L2 of the circumferential plugging portions 5b decreases in steps as the distance of the circumferential plugging portions 5b from the center of gravity of the section of the honeycomb structure 10 increases toward the circumference. The honeycomb filter 200 shown in FIG. 5 is preferable in terms of exhaust gas purification performance. FIG. 5 is a sectional view schematically showing another embodiment of the honeycomb filter in accordance with the present invention. In the honeycomb filter 200 shown in FIG. 5, the like constituent elements as those of the honeycomb filter 100 shown in FIG. 1 to FIG. 4 will be assigned like reference numerals and the detailed descriptions thereof will be omitted.

In the honeycomb filter 200 shown in FIG. 5 also, the plugging length L1 of central plugging portions 5a preferably ranges from 3 mm to 6 mm, and the plugging length L2 of the circumferential plugging portions 5b preferably ranges from 7 mm to 9 mm.

The area S1 of the central region 15 and the area S2 of the circumferential region 16 of the honeycomb filter 100 shown in FIG. 1 to FIG. 4 can be determined according to, for example, the following method. First, the plugging length of each of the plugging portions 5 on the inflow end face 11 side and on the outflow end face 12 side of the honeycomb filter 100 is measured according to the method described above, and the boundary between the central plugging portions 5a and the circumferential plugging portions 5b is identified. The boundary between the central plugging portions 5a and the circumferential plugging portions 5b provides the boundary between the central region 15 and the circumferential region 16 in a plane orthogonal to the extending direction of the cells 2 of the honeycomb structure 10. The area from a surface of each of the partition walls 1 to a position that is half the thickness of the partition wall 1 is regarded as the boundary in the partition walls 1 surrounding the central plugging portions 5a on the outermost circumference of the central region 15, and the area on the inner side of the boundary is defined as the area S1. Further, the area S2 is calculated on the basis of the difference between the area of the plane orthogonal to the extending direction of the cells 2 of the honeycomb structure 10 and the area S1.

There is no particular restriction on the porosity of the cell 2 of each of the plugging portions 5. For example, the porosity of the cell 2 of each of the plugging portions 5 preferably ranges from 60% to 85%, and more preferably ranges from 65% to 80%. In terms of exhaust gas purification performance, it is not preferable that the porosity of the plugging portions 5 be below 60%. In terms of erosion, it is not preferable that the porosity of the plugging portions 5 exceed 85%.

The porosity of the plugging portions 5 can be measured as described below. A portion equivalent to one cell that includes one plugging portion 5 and the partition walls 1 around the plugging portion 5 is cut out from the honeycomb filter 100 and processed to remove the partition walls 1 around the plugging portion 5. Thereafter, the mass of the plugging portion 5 is measured, and the porosity is calculated on the basis of the measured mass and the true density of a plugging material constituting the plugging portion 5.

In the plugging portions 5, which include the central plugging portions 5a and the circumferential plugging portions 5b, preferably, the value of the porosity is substantially constant in the extending direction of the cell 2 for each of the plugging portions 5. More specifically, each of the plugging portions 5 are preferably composed of a porous material having substantially the same porosity as a whole rather than locally increasing or decreasing the porosity by, for example, applying a glaze or the like to the surface on the inflow end face 11 side or the outflow end face 12 side.

In the honeycomb structure 10, the porosity of the partition walls 1 preferably ranges from 52% to 66%, and more preferably ranges from 55% to 63%. The honeycomb filter 100 exhibits further marked effect when using the honeycomb structure 10 with high porosity, the porosity of the partition walls 1 ranging from 55% to 63%. The porosity of the partition walls 1 denotes a value measured by the mercury press-in method. The porosity of the partition walls 1 can be measured by using, for example, Micromeritics' AutoPore 9500 (trade name). A part of the partition walls 1 is cut out from the honeycomb structure 10 to obtain a test piece, and the measurement of the porosity of the partition walls 1 can be performed by using the test piece obtained as described above. The porosity of the partition walls 1 preferably has a constant value in the entire honeycomb structure 10. For example, the absolute value of the difference between a maximum value and a minimum value of the porosity of the partition walls 1 of each part is preferably 5% or less.

In the honeycomb structure 10, the thickness of the partition walls 1 preferably ranges from 0.15 mm to 0.30 mm, and more preferably ranges from 0.15 mm to 0.25 mm, and particularly preferably ranges from 0.20 mm to 0.25 mm. The thickness of the partition walls 1 can be measured by using, for example, a scanning electron microscope or a microscope. If the thickness of the partition walls 1 is below 0.15 mm, then a sufficient strength may not be obtained. On the other hand, if the thickness of the partition walls 1 exceeds 0.30 mm, then the pressure loss of the honeycomb filter 100 may increase.

There is no particular restriction on the shapes of the cells 2 defined by the partition walls 1. For example, the shapes of the cells 2 in the section that is orthogonal to the extending direction of the cells 2 may be polygonal, circular, elliptical or the like. A polygonal shape may be triangular, quadrangular, pentagonal, hexagonal, octagonal or the like. The shapes of the cells 2 are preferably triangular, quadrangular, pentagonal, hexagonal or octagonal. Further, regarding the shapes of the cells 2, all the cells 2 may have the same shape or different shapes. For example, although not shown, quadrangular cells and octagonal cells may be mixed. Further, regarding the sizes of the cells 2, all the cells 2 may have the same size or different sizes. For example, although not shown, among the plurality of cells, some cells may be larger and some other cells may be relatively smaller. In the present invention, the term "cells" means the spaces surrounded by the partition walls.

In the honeycomb filter 100, the cell structure of the honeycomb structure 10 is preferably the same in the central region 15 and the circumferential region 16. This configuration causes a gas to evenly flow, so that the configuration is preferable in terms of pressure loss. The cell structure means the structure of the cells 2 in the honeycomb structure 10, including the thickness of the partition walls 1, the shapes of the cells 2, the cell density, and the like.

In the honeycomb structure 10, the cell density of the cells 2 defined by the partition walls 1 preferably ranges from 27 to 51 cells/cm$^2$ and more preferably ranges from 31 to 47 cells/cm$^2$. This configuration makes it possible to suppress an increase in pressure loss while maintaining the PM trapping performance of the honeycomb filter 100.

The circumferential wall 3 of the honeycomb structure 10 may be configured integrally with the partition walls 1 or may be a circumferential coat layer formed by applying a circumferential coating material, encompassing the partition walls 1. Although not shown, the circumferential coat layer can be provided on the circumferential side of the partition walls after the partition walls and the circumferential wall are integrally formed and then the formed circumferential wall is removed by a publicly known method, such as grinding, in a manufacturing process.

There is no particular restriction on the shape of the honeycomb structure 10. The honeycomb structure 10 may be pillar-shaped, the shapes of the inflow end face 11 and the outflow end face 12 being circular, elliptical, polygonal or the like.

There is no particular restriction on the size of the honeycomb structure 10, e.g. the length from the inflow end face 11 to the outflow end face 12 and the size of the section that is orthogonal to the extending direction of the cells 2 of the honeycomb structure 10. Each size may be selected as appropriate such that optimum purification performance is obtained when the honeycomb filter 100 is used as a filter for purifying an exhaust gas. For example, the length from the inflow end face 11 to the outflow end face 12 of the honeycomb structure 10 preferably ranges from 90 mm to 160 mm and more preferably ranges from 120 mm to 140 mm. Further, the area of the section that is orthogonal to the extending direction of the cells 2 of the honeycomb structure 10 preferably ranges from 100 cm$^2$ to 180 cm$^2$ and more preferably ranges from 110 cm$^2$ to 150 cm$^2$.

There is no particular restriction on the material of the partition walls 1. For example, the material of the partition walls 1 preferably includes at least one selected from a group composed of silicon carbide, cordierite, a silicon-silicon carbide composite material, cordierite-silicon carbide composite material, silicon nitride, mullite, alumina, and aluminum titanate.

There is no particular restriction on the material of the plugging portions 5, either. For example, the same material as the material of the partition walls 1 described above can be used. In the plugging portions 5 also, the material of the central plugging portions 5a and the material of the circumferential plugging portions 5b may be different or the same.

(2) Manufacturing Method for the Honeycomb Filter

There is no particular restriction on the method for manufacturing the honeycomb filter in accordance with the present invention, and the following method, for example, may be used. First, a plastic kneaded material for producing the honeycomb structure is prepared. The kneaded material for producing the honeycomb structure can be prepared by adding an additive, such as a binder, a pore former, and water, as appropriate, to a material selected from among the foregoing suitable materials of the partition walls as raw material powder.

Subsequently, the kneaded material obtained as described above is subjected to extrusion thereby to obtain a pillar-shaped honeycomb formed body having partition walls that define a plurality of cells, and a circumferential wall provided, surrounding the partition walls. Then, the obtained honeycomb formed body is dried by, for example, microwave and hot air.

Subsequently, plugging portions are provided at the open ends of the cells of the dried honeycomb formed body. More specifically, for example, a plugging material that contains a raw material for forming the plugging portions is first prepared. Then, a mask is provided on the inflow end face of the honeycomb formed body to cover the inflow cells. Next, the plugging material that has been prepared is filled in the open ends of the outflow cells not provided with the mask on the inflow end face side of the honeycomb formed body. Thereafter, for the outflow end face of the honeycomb formed body also, the plugging material is filled in the open ends of the inflow cells by the same method described above.

In the manufacture of the honeycomb filter in accordance with the present invention, when filling the plugging material, the plugging material is filled such that the filling depth of the plugging material in the region in which the central plugging portions are to be formed is relatively smaller than the filling depth of the plugging material in the region in which the circumferential plugging portions are to be formed. Thus, the plugging length L1 of the central plugging portions is set to be relatively smaller than the plugging length L2 of the circumferential plugging portions. For example, a smaller amount of application of the plugging material is used in a predetermined region (e.g. the region in which the central plugging portions are to be formed), and a larger amount of application of the plugging material is used in the residual region (e.g. the region in which the circumferential plugging portions are to be formed), thus making it possible to adjust the filling depth.

Subsequently, the honeycomb formed body with the plugging portions provided at the open ends of one side of the cells is fired to manufacture the honeycomb filter in accordance with the present invention. The firing temperature and the firing atmosphere vary according to a material, and a person skilled in the art can select a firing temperature and a firing atmosphere that are best suited for a selected material.

EXAMPLES

The following will describe the present invention further specifically by examples; however, the present invention is not limited at all by the examples.

Example 1

Ten parts by mass of a pore former, 20 parts by mass of a dispersing medium, and 1 part by mass of an organic binder were added to 100 parts by mass of a cordierite forming raw material and mixed, and the mixture was kneaded to prepare a kneaded material. As the cordierite forming raw material, alumina, aluminum hydroxide, kaolin, talc, and silica were used. As the dispersing medium, water was used. As the organic binder, methylcellulose was used. As a dispersing agent, dextrin was used. As the pore former, coke having an average particle diameter of 15 μm was used.

Subsequently, the kneaded material was subjected to extrusion using a die for making honeycomb formed bodies thereby to obtain a honeycomb formed body, the entire shape of which was a round pillar shape. The shape of the cells of the honeycomb formed body was quadrangular.

Subsequently, the honeycomb formed body was dried by a microwave drier, and further dried by a hot air drier to completely dry the honeycomb formed body. Thereafter, both end faces of the honeycomb formed body were cut to predetermined dimensions.

Subsequently, the plugging material for forming the plugging portions were prepared. Thereafter, by using the plugging material, the central plugging portions and the circumferential plugging portions were formed at the open ends of the cells on the inflow end face side of the dried honeycomb formed body. More specifically, first, a mask was provided on the inflow end face of the honeycomb formed body to cover the inflow cells. Then, the plugging material was filled in the open ends of the outflow cells not provided with the mask such that the filling depth of the plugging material became relatively smaller in the region in which the central plugging portions are to be formed. Thus, the central plugging portions and the circumferential plugging portions were formed.

Subsequently, the outflow end face of the honeycomb formed body was also provided with a mask to cover the outflow cells. Then, the plugging material was filled in the open ends of the inflow cells not provided with the mask, thereby forming the central plugging portions and the circumferential plugging portions.

Subsequently, the honeycomb formed body in which the plugging portions had been formed was degreased and fired thereby to manufacture the honeycomb filter of Example 1.

The honeycomb filter of Example 1 was round pillar-shaped, and the shapes of the inflow end face and the outflow end face thereof were circular. The diameters of the inflow end face and the outflow end face were 118 mm. Further, the extending-direction length of the cells of the honeycomb filter was 127 mm. In the honeycomb filter of Example 1, the thickness of the partition walls was 0.22 mm, the porosity of the partition walls was 55%, and the cell density was 31 cells/cm$^2$. Table 1 shows the thickness of the partition walls, the porosity of the partition walls, and the cell density of the honeycomb filter. The porosity of the partition walls was measured by using Micromeritics' AutoPore 9500 (trade name).

The honeycomb filter of Example 1 was configured such that the plugging length L1 of the central plugging portions, which were the plugging portions existing in the central region, was smaller than the plugging length L2 of the circumferential plugging portions, which were the plugging portions existing in the circumferential region. The plugging length L1 of the central plugging portions ranged from 3 mm to 4 mm, and the average value thereof was 3.5 mm. The plugging length L2 of the circumferential plugging portions ranged from 7 mm to 8 mm, and the average value thereof was 7.5 mm. The plugging length L1 of the central plugging portions and the plugging length L2 of the circumferential plugging portions were measured by inserting a bar having a length which is known and which is larger than the total length of the honeycomb filter into the cells. In the honeycomb filter of Example 1, the area ratio (S2/S1), which is the ratio of the area S2 of the circumferential region with respect to the area S1 of the central region, was 0.19. The results are shown in Table 1. In Table 1, the columns of "Plugging length L1 (max.) (mm)" and "Plugging length L1 (min.) (mm)" of "Central plugging portion" show the maximum value and the minimum value obtained when the plugging length L1 differs in the central plugging portions of the central region. Further, in Table 1, the columns of "Plugging length L2 (max.) (mm)" and "Plugging length L2 (min.) (mm)" of "Circumferential plugging portion" show the maximum value and the minimum value obtained when the plugging length L2 differs in the circumferential plugging portions of the circumferential region. If the plugging length of the central plugging portions and the plugging length of the circumferential plugging portions in the regions are constant, then the values in the columns will be the same.

TABLE 1

|  | Honeycomb structure | | | Area ratio between central region and circumferential region (S2/S1) | Central plugging portion | | Circumferential plugging portion | |
|---|---|---|---|---|---|---|---|---|
|  | Thickness of partition wall (mm) | Porosity of partition wall (%) | Cell density (cells/cm$^2$) |  | Plugging length L1 (max.) (mm) | Plugging length L1 (min.) (mm) | Plugging length L2 (max.) (mm) | Plugging length L2 (min.) (mm) |
| Example 1 | 0.22 | 55 | 31 | 0.19 | 4 | 3 | 8 | 7 |
| Example 2 | 0.22 | 57 | 31 | 0.39 | 6 | 4 | 9 | 7 |
| Example 3 | 0.21 | 62 | 47 | 0.41 | 4 | 3 | 8 | 7 |
| Example 4 | 0.23 | 64 | 47 | 0.24 | 5 | 4 | 9 | 8 |
| Example 5 | 0.19 | 65 | 47 | 0.19 | 6 | 5 | 8 | 7 |
| Example 6 | 0.19 | 65 | 47 | 0.39 | 6 | 3 | 9 | 7 |
| Comparative example 1 | 0.23 | 63 | 47 | — | 4 | 4 | 4 | 4 |
| Comparative example 2 | 0.22 | 55 | 31 | — | 6 | 6 | 6 | 6 |

TABLE 1-continued

| | Honeycomb structure | | | Area ratio between central region and circumferential region (S2/S1) | Central plugging portion | | Circumferential plugging portion | |
|---|---|---|---|---|---|---|---|---|
| | Thickness of partition wall (mm) | Porosity of partition wall (%) | Cell density (cells/cm$^2$) | | Plugging length L1 (max.) (mm) | Plugging length L1 (min.) (mm) | Plugging length L2 (max.) (mm) | Plugging length L2 (min.) (mm) |
| Comparative example 3 | 0.22 | 63 | 47 | — | 5 | 5 | 5 | 5 |
| Comparative example 4 | 0.23 | 57 | 31 | 0.51 | 6 | 5 | 9 | 8 |

On the honeycomb filter of Example 1, the "Evaluation of exhaust gas purification performance", the "Evaluation of falling off of plugging portions", and the "Evaluation of isostatic strength" were carried out according to the following method. Table 2 shows the results.

[Evaluation of Exhaust Gas Purification Performance]

First, exhaust gas purifiers using the honeycomb filters of the examples as the filters for purifying an exhaust gas were fabricated. Each of the fabricated exhaust gas purifiers was connected to an outlet side of an engine exhaust manifold of a 1.2 L direct injection type gasoline engine vehicle, and the concentration of NOx contained in the gas emitted through the outflow port of the exhaust gas purifier was measured to determine the NOx purification rate. Based on the value of the purification rate of NOx in each measurement, the exhaust gas purification performance was evaluated according to the following evaluation standard. The column of "Ratio of NOx purification rate (%)" of Table 2 shows the value of the purification rate (%) of NOx of the exhaust gas purifier using the honeycomb filter of each example when the value of the purification rate of NOx of the exhaust gas purifier using the honeycomb filter of Comparative Example 1 is defined as 100%.

Evaluation "Excellent": If the value of the ratio of the NOx purification rate is 105% or more, then the evaluation result is denoted by "Excellent."

Evaluation "Good": If the value of the ratio of the NOx purification rate exceeds 103% and is below 105%, then the evaluation result is denoted by "Good."

Evaluation "Acceptable": If the value of the ratio of the NOx purification rate exceeds 100% and is 103% or less, then the evaluation result is denoted by "Acceptable."

Evaluation "Fail": If the value of the ratio of the NOx purification rate is 100% or less, then the evaluation result is denoted by "Fail."

[Evaluation of Falling Off of Plugging Portions]

The side surface of the honeycomb filter of each example was wrapped with a mat according to the following method, and the honeycomb filter wrapped with the mat was pushed into a can body to support the honeycomb filter by the can body. When wrapping the mat, an edge of the mat was positioned at 5 mm on the inner side from an end face of the honeycomb structure constituting the honeycomb filter, and the entire side surface of the honeycomb filter was covered with the mat. The honeycomb filter was held such that the degree of compression, i.e. the gap bulk density (GBD), of the mat at that time was 0.45 g/cm$^3$, and the occurrence of the falling off of the plugging portions from the cells was checked.

Evaluation "OK": If the falling off of the plugging portions does not occur in the honeycomb filter to be evaluated, then the evaluation result is denoted by "OK."

Evaluation "NG": If the falling off of the plugging portions occurs in the honeycomb filter to be evaluated, then the evaluation result is denoted by "NG."

[Evaluation of Isostatic Strength]

The isostatic strength (MPa) of the honeycomb filter of each example and each comparative example was measured according to the measurement method of isostatic breaking strength specified by JASO standard M505-87, which is the automotive standard issued by the Society of Automotive Engineers of Japan, Inc. Table 2 shows the values of the measured isostatic strength (MPa). Further, the ratios of the isostatic strengths of the honeycomb filters when the value of the isostatic strength of the honeycomb filter of Comparative Example 1 is defined as 100% are shown in the column of "Isostatic strength ratio (%)" of Table 2. Regarding the evaluation of the isostatic strength, the honeycomb filter of each example was evaluated according to the following evaluation standard.

Evaluation "Excellent": If the value of the isostatic strength ratio (%) is 120% or more, then the evaluation result is denoted by "Excellent."

Evaluation "Good": If the value of the isostatic strength ratio (%) is 110% or more and below 120%, then the evaluation result is denoted by "Good."

Evaluation "Acceptable": If the value of the isostatic strength ratio (%) exceeds 100% and is below 110%, then the evaluation result is denoted by "Acceptable."

Evaluation "Fail": If the value of the isostatic strength ratio (%) is 100% or less, then the evaluation result is denoted by "Fail."

Examples 2 to 6

Honeycomb filters were made according to the same method as that used for the honeycomb filter of Example 1 except that the configurations of the honeycomb filters were changed as shown in Table 1.

Comparative Examples 1 to 4

Honeycomb filters were made according to the same method as that used for the honeycomb filter of Example 1 except that the configurations of the honeycomb filters were changed as shown in Table 1.

On the honeycomb filters of Examples 2 to 6 and Comparative Examples 1 to 4 also, the "Evaluation of exhaust gas purification performance", the "Evaluation of falling off of plugging portions", and the "Evaluation of isostatic strength" were carried out according to the same method as that used for Example 1. Table 2 shows the results.

TABLE 2

|  | Ratio of NOx purification rate (%) | Isostatic strength ratio (%) | Evaluation of exhaust gas purification performance | Evaluation of falling off of plugging portions | Evaluation of isostatic strength |
|---|---|---|---|---|---|
| Example 1 | 101 | 135 | Acceptable | OK | Excellent |
| Example 2 | 103 | 128 | Good | OK | Excellent |
| Example 3 | 101 | 105 | Acceptable | OK | Acceptable |
| Example 4 | 104 | 101 | Good | OK | Acceptable |
| Example 5 | 109 | 109 | Excellent | OK | Acceptable |
| Example 6 | 109 | 110 | Excellent | OK | Good |
| Comparative example 1 | 100 | 100 | Reference | NG | Reference |
| Comparative example 2 | 99 | 133 | Fail | OK | Excellent |
| Comparative example 3 | 102 | 89 | Acceptable | NG | Fail |
| Comparative example 4 | 99 | 141 | Fail | OK | Excellent |

The evaluation results verified that the isostatic strength, the falling off of the plugging portions, and the exhaust gas purification performance of the honeycomb filters of Examples 1 to 6 are higher than those of the honeycomb filter of Comparative Example 1, which was the reference. Thus, it was found that the honeycomb filters of Examples 1 to 6 exhibit higher purification performance while maintaining required isostatic strength and preventing the plugging portions from falling off from the cells, as compared with conventional honeycomb filters.

INDUSTRIAL APPLICABILITY

The honeycomb filter in accordance with the present invention can be used as a filter for trapping particulate matter in an exhaust gas.

DESCRIPTION OF REFERENCE NUMERALS

1: partition wall; 2: cell; 2a: inflow cell; 2b: outflow cell; 3: circumferential wall; 5: plugging portion; 5a: central plugging portion; 5b: circumferential plugging portion; 10: honeycomb structure; 11: inflow end face; 12: outflow end face; 15: central region; 16: circumferential region; and 100, 200: honeycomb filter.

What is claimed is:

1. A honeycomb filter comprising:
a pillar-shaped honeycomb structure having porous partition walls provided, surrounding a plurality of cells which serve as fluid through channels extending from an inflow end face to an outflow end face; and
porous plugging portions provided either at the ends on the inflow end face side of the plurality of cells or at the ends on the outflow end face side of the plurality of cells,
wherein the plugging portions are composed of a porous material,
the honeycomb structure has a central region that includes a center of gravity in a section orthogonal to a direction in which the plurality of cells extend, and a circumferential region on a farther circumferential side from the central region, and has S2/S1, which denotes a ratio of an area S2 of the circumferential region with respect to an area S1 of the central region, ranging from 0.1 to 0.5, and
a plugging length L1 in the direction in which the plurality of cells extend of a central plugging portion that is the plugging portion existing in the central region is smaller than a plugging length L2 in the direction in which the plurality of cells extend of a circumferential plugging portion that is the plugging portion existing in the circumferential region, the plugging length L1 of the central plugging portion ranges from 3 mm to 6 mm, and the plugging length L2 of the circumferential plugging portion ranges from 7 mm to 9 mm, and
wherein the plurality of central plugging portions are configured such tat the plugging lengths of the plurality of central plugging portions arranged in order toward the circumference increase in steps from the central plugging portions provided closer to the center of gravity in the radial direction of the section,
the circumferential plugging portions are configured such tat the plugging lengths of the circumferential plugging portions arranged in order toward the circumference decrease in steps from the circumferential plugging portions provided closer to the center of gravity in the radial direction of the section, and
wherein the inflow end face and the outflow end face of the honeycomb filter are opposite and parallel to each other over an entire inflow end face and outflow end face.

2. The honeycomb filter according to claim 1, wherein a cell structure of the honeycomb structure is the same in the central region and the circumferential region.

3. The honeycomb filter according to claim 1, wherein t porosity of the porous partition walls ranges from 52% to 66%.

* * * * *